United States Patent [19]

Iwaya et al.

[11] Patent Number: 5,015,332
[45] Date of Patent: May 14, 1991

[54] SPRAY DRYER

[75] Inventors: Shoichi Iwaya; Hitoshi Masumura, both of Yuri; Hiroki Takahashi, Honjou; Masaaki Ohkawara; Katsumi Kobayashi, both of Yokohama; Takashi Ito, Machida, all of Japan

[73] Assignees: TDK Corporation, Tokyo; Ohkawara Kakohki Co., Ltd., Kanagawa, both of Japan

[21] Appl. No.: 306,451

[22] PCT Filed: Jul. 5, 1988

[86] PCT No.: PCT/JP88/00670
§ 371 Date: Jan. 25, 1989
§ 102(e) Date: Jan. 25, 1989

[87] PCT Pub. No.: WO89/00070
PCT Pub. Date: Jan. 12, 1989

[30] Foreign Application Priority Data

Jul. 6, 1987 [JP] Japan .................. 62-103749[U]
Jul. 6, 1987 [JP] Japan .................. 62-103752[U]
Jul. 6, 1987 [JP] Japan .................. 62-103753[U]

[51] Int. Cl.$^5$ ............................ B01D 1/18; F26B 3/06
[52] U.S. Cl. .......................................... 159/4.2; 34/10; 34/57 R; 159/48.1; 159/DIG. 28; 159/DIG. 41; 202/236; 203/90
[58] Field of Search ...................... 159/4.01, 4.2, 48.1, 159/DIG. 27, DIG. 28, DIG. 41; 203/90; 202/236, 237; 34/10, 57 R

[56] References Cited

U.S. PATENT DOCUMENTS

| | | | |
|---|---|---|---|
| 1,512,776 | 10/1924 | Lough | 159/4.01 |
| 3,011,543 | 7/1957 | McCormick | 159/4.01 |
| 3,346,033 | 10/1967 | Olejniczak | 159/4.2 |
| 3,504,859 | 4/1970 | Babington et al. | 159/4.2 |
| 3,847,714 | 11/1974 | Davies et al. | 159/4.02 |
| 3,867,234 | 2/1975 | Smith et al. | 159/4.2 |
| 4,012,846 | 3/1977 | Silva | 159/4.01 |
| 4,089,120 | 5/1978 | Kozischek | 34/12 |
| 4,430,155 | 2/1984 | Kozischek et al. | 159/4.2 |
| 4,549,053 | 10/1985 | Haugh | 159/DIG. 26 |
| 4,664,752 | 5/1987 | Zievers et al. | 203/10 |
| 4,708,967 | 11/1987 | Ferentchak et al. | 159/48.1 |
| 4,762,538 | 8/1988 | Michler et al. | 159/4.2 |
| 4,809,442 | 3/1989 | Iwaya et al. | 34/10 |

FOREIGN PATENT DOCUMENTS 55-79002 6/1980 Japan .
62-152501 7/1987 Japan .
62-152502 7/1987 Japan .
382129 10/1932 United Kingdom .

Primary Examiner—Virginia Manoharan
Attorney, Agent, or Firm—Parkhurst, Wendel & Rossi

[57] ABSTRACT

A spray drying chamber with a head section and a heat-resistant porous membrane, the porous membrane being detachable and the head section being displaceable vertically, whereby microdrops are sprayed into a spray drying chamber together with hot air, and whereby the microdrops are dried momentarily and a fine powder is produced.

3 Claims, 6 Drawing Sheets

SPRAY DRYER

FIELD OF THE INVENTION

The present invention relates to a spray dryer, particularly to a spray dryer for reducing the pollution of a spray drying chamber by powder and preventing the compositional variation of the powder product.

BACKGROUND

Spray dryers basically have three essential functions of (1) spraying feed liquid, (2) drying resulting microdrops and (3) separating and recovering a resulting fine powder product, and ordinarily have an atomizer, a drying chamber and a fine powder recovering unit, respectively, corresponding to the above functions.

As examples of these spray dryers, there have hitherto been known those shown in FIGS. 9 and 10 (see Japanese Patent Publication No. 32601/1983 and Japanese Utility Model Laid-Open No. 26950/1983).

In the spray dryer of FIG. 9, a feed liquid is sprayed into a drying chamber 1 from a nozzle 5 and is momentarily heated by hot air from an inlet 2, whereby the liquid component of the feed liquid is evaporated and the solid component is made into a fine powder. The majority of the fine powder is taken out as a product via a rotary valve 6. Part of the fine powder accompanies hot air, passes a waste gas outlet 3 and enters a cyclone 7, and is recovered from a rotary valve 8.

The spray dryer of FIG. 10 is a type using, as an atomizer, a rotary spraying disc (a rotary disc) 10 in place of the nozzle 5.

In the spray dryers as shown in FIGS. 9 and 10, a fine powder product is recovered separately in the main section of the dryer and in the cyclone. In this case, a powder of lighter particles having smaller particle diameters is recovered in the cyclone and a powder of heavier particles having larger particle diameters is taken out from the main section; accordingly, slight compositional variations in the product occurs.

In the past, this compositional variation posed little problem depending upon the type of product.

It has been required recently that spray dryers can perform, instead of conventional few grade, large quantity type production, many grade, small quantity type production especially for medicines, fine ceramics, etc.

Also, it is increasingly required that spray dryers produce a product of higher purity.

Under these new situations requiring a spray dryer capable of providing many grade, small quantity type production and a powder of the higher purity, the abovementioned compositional variation of product which posed little problem in the past has entered a new phase. Moreover a new problem has arisen.

That is, with the increase in the frequency of product switch-over, the rapid and complete washing of the deposit adhering to the inner wall of the drying chamber has become necessary. It is necessary because if washing takes a long time it is detrimental to the efficient execution of many grade, small quantity type production and also because the complete washing of the deposit adhering to the inner wall of the drying chamber, which is required in the product switchover when a product of higher purity and higher quality is needed, is very difficult. Moreover, when a product harmful to humans is produced, washing is extremely difficult because the operator is prohibited from making direct contact with the product.

Further, the requirement for a product of higher purity has turned the above-mentioned slight compositional variation among products into a problem.

SUMMARY OF THE INVENTION

In view of the above-mentioned problems of the prior art, the present inventors conducted experimentation and, as a result, reached the present invention.

According to the present invention a spray dryer is provided for momentarily drying microdrops by spraying the microdrops into a spray drying chamber together with hot air, the spray dryer being characterized in that the spray drying chamber is formed by a head section and a heatresistant porous membrane and that the heat-resistant porous membrane is made detachable and the head section is made displaceable vertically.

The heat-resistant porous membrane forming the outer wall of the spray drying chamber is swollen into a pot shape during operation.

At least either the ceiling or the bottom of the porous membrane is preferably made gas impermeable. In general, when a porous membrane is used, gas flows out through the porous membrane making tumbling of a powder inside the porous membrane difficult; however, when the bottom of the porous membrane is made gas impermeable, the powder can tumble smoothly inside the porous membrane. The reason for making the ceiling of the porous membrane gas impermeable is that if the ceiling is porous, the gas flows out of the ceiling, inviting easy adhesion of undried microdrops to the ceiling, which causes the clogging of the porous membrane or formation of particles of abnormal shape from dry grown deposits.

The gas impermeable portion of the porous membrane is preferably made of a material such as a heat-resistant sheet, heat-resistant rubber or the like. Specific examples of such a material include Silicone Rubber, manufactured by Shin-Etsu Chemical, Teflon Sheet, manufactured by Du Pont, PFA Sheet, manufactured by Mitsui Fluoro Chemical and Chuko Flow Belt, manufactured by Chuko Chemical.

The porous membrane used in the present invention preferably has heat resistance and very little adhesion for the powder.

That is, since the hot air introduced into the spray drying chamber ordinarily has an inlet temperature of about 120°-280° C. and an outlet temperature of about 150°-70° C., the porous membrane must be resistant to these temperatures. Moreover, since a fine powder adheres to and deposits on the porous membrane constantly, the porous membrane preferably has very little adhesion for the powder to ensure its continuous operation. The porous membrane is fitted detachably and can be replaced when necessary because it is worn during the continuous use. The porous membrane separates an intended fine powder from a waste gas.

The porous membrane having such functions has no restriction with respect to the type. However, a fibrous cloth is oridinarily used (e.g. woven cloth, nonwoven cloth) or a membrane obtained by combining at least two such cloths. As the material of the woven or unwoven cloth, a polyimide, a heat-resistant nylon, a polyester and an aramid are preferably ued. As a preferably porous membrane, a laminate of a reticulate film of very little adhesion for the powder and a woven or unwoven cloth as a fortifying material are used. As the reticulate film, a film of polytetrafluoroethylene (PTFE) (Teflon, brand name) and a film of polytrifluoroethylene are prefereably used.

It is further preferable that the porous membrane be formed so as to be storable by folding and, when in operation, to be swollen by making the inside pressure positive. The increase in the amount of air fed in order to increase the drying rate of particles results in the increase in the pressure difference between the inside and the outside of the spray drying chamber formed by the porous membrane. Hence, the present inventors investigated on the range of the pressure difference between the inside and the outside of the porous membrane at which there occurs no particle leakage through the porous membrane, as well as on the range of the gas permeability of the porous membrane at that pressure difference. As a result, it was found that the preferable pressure difference ($\Delta P$), between the inside and the outside of the porous membrane, is in a range of 5–250 mm Aq., particularly 7–40 mm Aq. and the preferable gas permeability of the porous membrane is in a range of 0.5–50 cc/sec/cm$^2$, particularly 1.0–8.0 cc/sec/cm$^2$ when $\Delta P$ is 12.7 mm Aq.

It is furthermore preferable that the porous membrane be connected to a fixing portion for the head section with, for example, a hook and that the ceiling of the spray drying chamber formed by the porous membrane be inclined upward from the center to the circumferential direction because such inclination prevents the adhesion of microdrops to the ceiling even when part of the microdrops formed by spraying flies diagonally upward.

It is preferable that the powder outlet of the porous membrane be detachably fitted to a recovery unit for the powder product because such fitting is convenient for the replacement or storage of the porous membrane. It is likewise preferable that the atomizer be detachably fitted to the ceiling of the porous membrane.

When there is provided a waste gas-shielding curtain so as to surround the porous membrane, independent ventilation for each spray dryer becomes possible resulting in a reduced ventilation cost. Such a curtain also gives higher safety because there occurs no powder scattering from the spray dryer even in an emergency case of porous membrane breakage. Preferably, the waste gas-shielding curtain is transparent and is made of a material impervious to vapor, hot air, etc. such as polyvinyl chloride, nylon, polyethylene and the like.

It is preferable that the porous membrane be provided with a means for elimination of static electricity. This is because when the spray drying chamber is formed of a porous membrane, the contact and friction between the porous membrane and fine particles generates static electricity and resultant discharging, which may invite ignition, explosion, etc. Application of a means for elimination of static electricity to the porous membrane makes easier the sweeping-off of fine particles which are easily charged with static electricity. As the specific means for elimination of static electricity, there can be mentioned, for example, the fitting of an earth line on the surface of the porous membrane, the use of a carbon fiber as a base material of the porous membrane, and the application of an electroconductive coating on the surface of the porous membrane.

With the spray dryer of the present invention, in some cases a powder adheres to and deposits on the inside of the porous material and the solid-gas separation by the porous membrane becomes impossible when the dryer has been operated continuously for a certain period of time. In order to deal with such cases, it is preferred to provide a means for sweeping off a deposited powder by vibration. As the means for sweeping off, a known vibrator such as vibrating screen, vibrating conveyor or the like can be used.

Microdrops formed by spraying can be made finer by using an ultrasonic spraying mechanism as a spraying means of the spray dryer. Therefore, this ultrasonic spraying mechanism can be preferably used when the production of a very fine powder (an ultrafine powder) is needed. In order to obtain dense granules of high bulk density, it is also preferable to provide, as a drying means for microdrops in the spray dryer, a drying means by microwave in addition to the drying means by hot air.

When a rotary disc type atomizer is used as a spraying means in the spray dryer of the present invention, it is preferable to form, on the surface of the rotary disc type atomizer (the surface contacts a feed liquid), a thin layer made of a material of very little adhesion for the powder, because such a thin layer can prevent scaling on the rotary disc surface even when a high concentration slurry is dried. When the rotary disc type atomizer is used as a spraying means, it is also preferable to allow the feed liquid-splitting pins of the rotary disc to have a projection for reducing the scattering of the feed liquid outside the pins. Desirably, the feed liquid-splitting pins basically have a columnar shape and each column has, at the side, a projection in an almost tangent line direction of the disc, but in a direction reverse to the rotating direction of the disc.

The action of the spray dryer of the present invention is described below.

A feed liquid is sprayed into a spray drying chamber formed by a head section and a heat-resistant porous membrane and is momentarily heat-dried by hot air blown into the spray drying chamber from an inlet at an inlet temperature of 120°–280° C., whereby a vapor and a fine powder are produced. The majority of the fine powder deposits on the bottom of the spray drying chamber owing to its own weight, while the gas is separated from the rest of the fine powder via the pores of the porous membrane and is discharged outside. Thus, all the fine powder is separated from the gas via the porous membrane and no compositional variation of the fine powder product occurs.

BRIEF EXPLANATION OF THE DRAWINGS

FIG. 7 is a schematic view showing an example of a spray dryer provided with a powdersweeping-off mechanism.

DETAILED DESCRIPTION OF THE PREFERRED EMBODIMENTS

The present invention is now described in more detail referring to the examples shown in the accompanying drawings.

Figure 1:
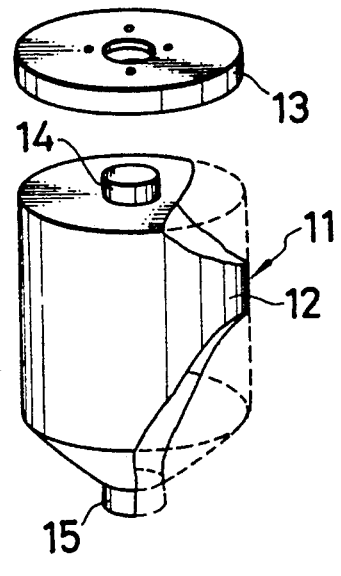
FIG. 1 is a schematic perspective view showing an example of a spray drying chamber used in the spray dryer according to the present invention.
Figure 2:
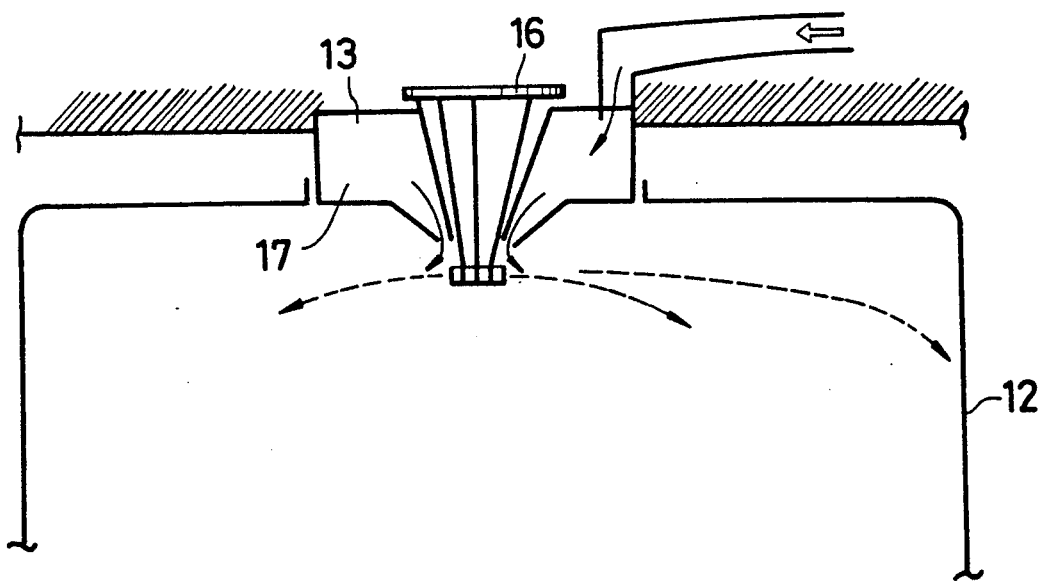
FIG. 2 is a sectional view showing an example of a joint section between a head section and a porous membrane.

FIG. 1 is a schematic perspective view showing an example of a spray drying chamber used in the spray dryer according to the present invention, and FIG. 2 is a sectional view showing an example of a joint section between a head section and a porous membrane. In FIG. 1, the spray drying chamber 11 is constituted by a porous membrane 12 of pot shape, a fixing section 14 provided at the top of the porous membrane 12 and connected to and fixing a metallic head section 13 (this fixing section 14 is also an inlet section through which a feed liquid, etc. is fed), and a powder outlet section 15 provided at the bottom of the porous membrane 12 and ordinarily connecting to a vibrating screen (not shown).

In the head section 13, there are provided an atomizer 16 (e.g. spray nozzle, spray disc) and a hot air distributor 17.

In the above spray dryer, hot air is fed into the spray drying chamber 11 downward from the hot air distributor 17 of the head section 13 and momentarily dries a feed liquid sprayed by the atomizer 16 fixed by the fixing section 14 provided at the top of the spray drying chamber 11, whereby a vapor and a fine powder are separated. The fine powder is taken out from the outlet section 15 at the bottom of the spray drying chamber 11, while the gas is separated from the fine powder via the porous membrane 12 forming the spray drying chamber 11 and they are independently discharged the outside.

Figure 3:
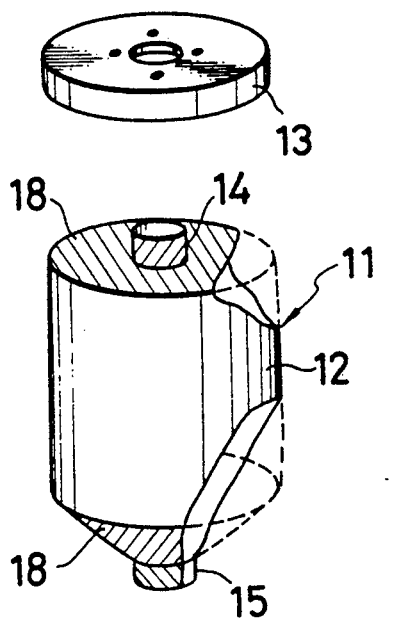
FIG. 3 is a schematic perspective view showing another example of a spray drying chamber used in the spray dryer according to the present invention.

FIG. 3 is a schematic perspective view showing another example of a spray drying chamber used in the spray dryer according to the present invention. In this example, the ceiling and the bottom of the spray drying chamber are covered with a gas impermeable heat-resistant sheet 18.

Figure 4:
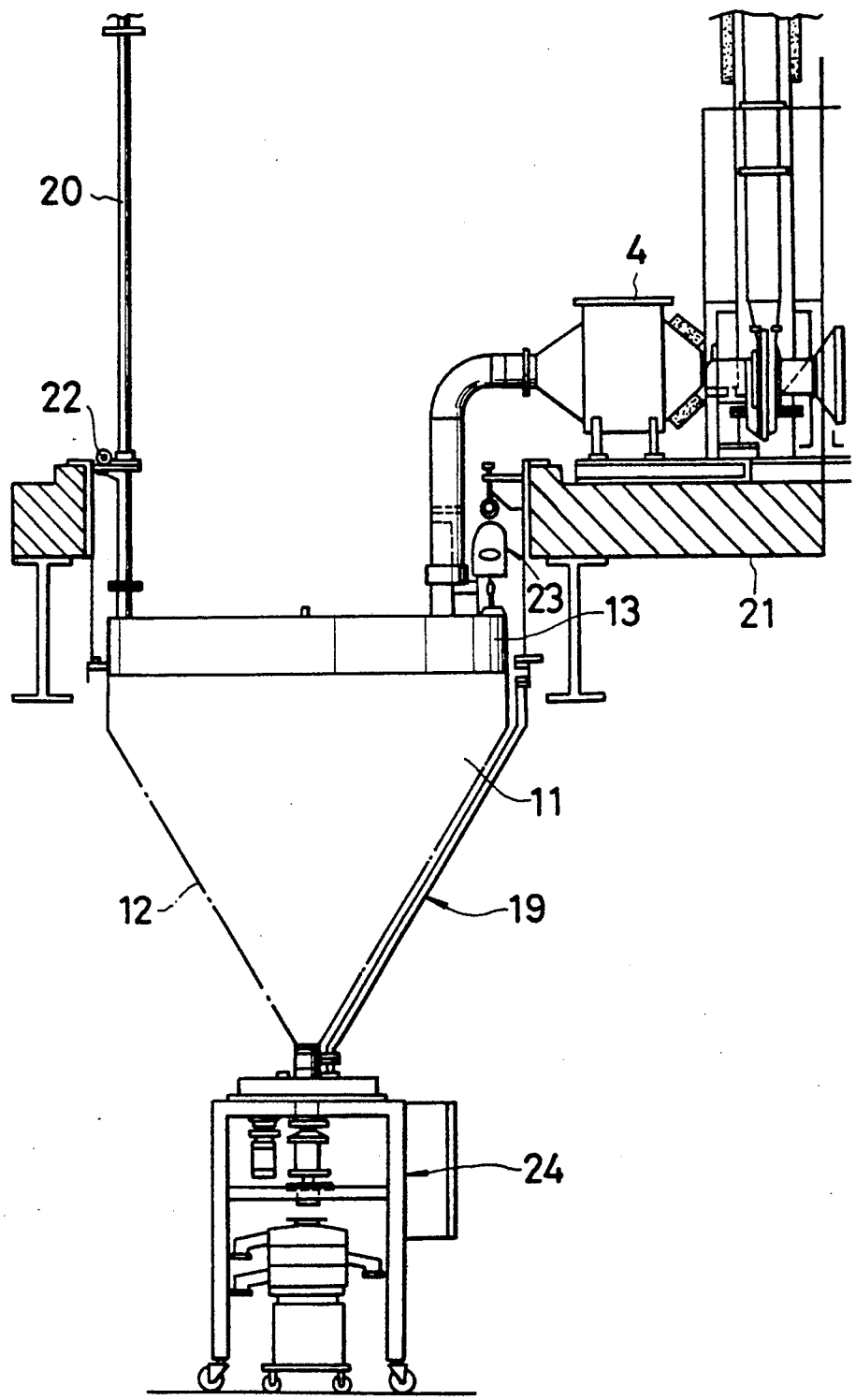
FIG. 4 is a sectional view showing an example of the spray dryer according to the present invention.
Figure 5A:
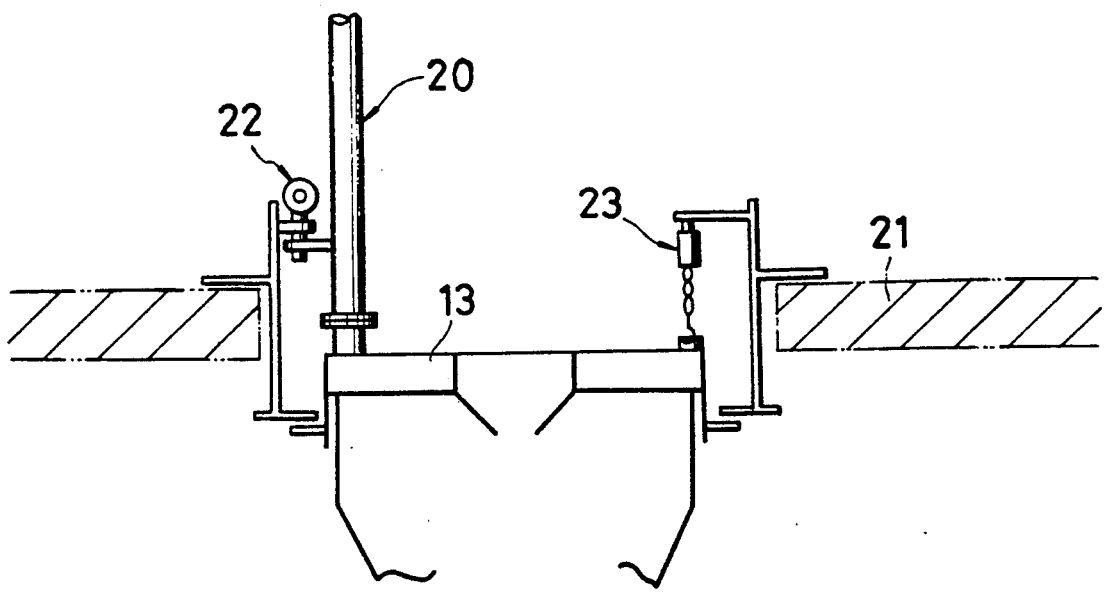
FIG. 5 is a fragmentary enlarged view of the spray dryer of FIG. 4, and (a) shows a state where the head section is being raised and (b) shows a state where the head section is being lowered.
Figure 5B:
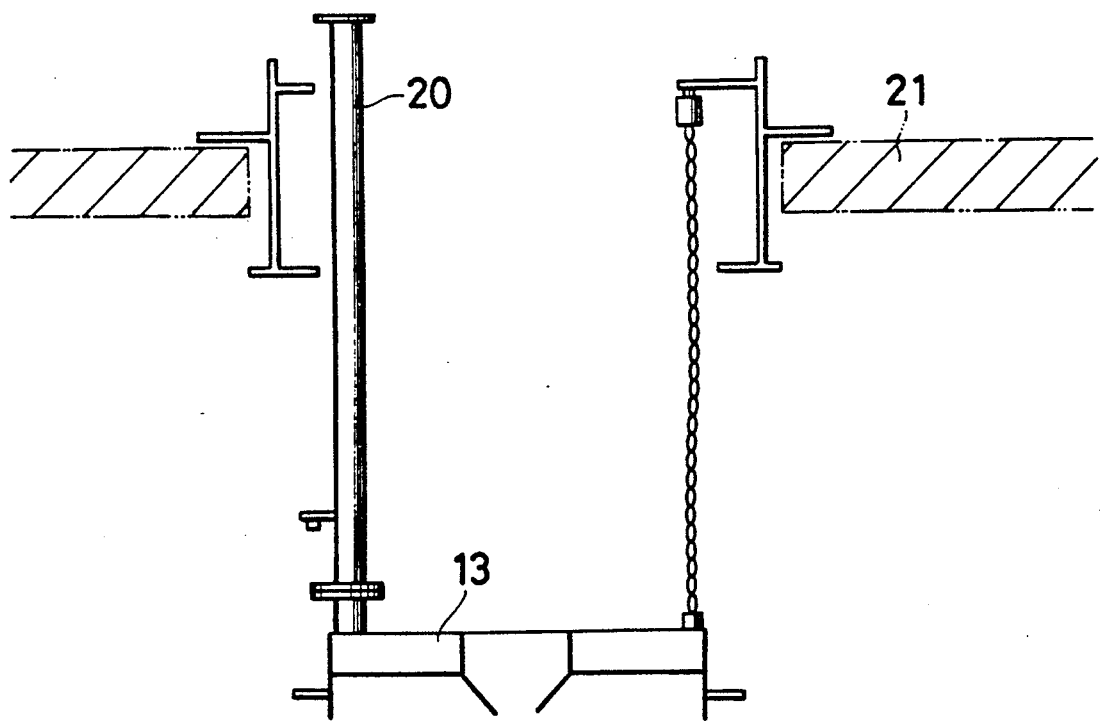

FIG. 4 is a sectional view showing an example of the spray dryer according to the present invention. FIG. 5 is a fragmentary enlarged view of the spray dryer of FIG. 4, and (a) shows a state where the head section is being raised and (b) shows a state where the head section is being lowered. In FIG. 4, 13 is a head section consisting of an atomizer and a hot air distributor; a porous membrane 12 hangs down from the outer periphery of the head section; and the head section and the porous membrane constitut a spray drying chamber 11. Outside the spray drying chamber 11 is provided an air sweeper 19 for sweeping off the fine powder deposited on the inner surface of the spray drying chamber 11. The air sweeper 19 rotates along the porous membrane 12 at a small distance (about 5-100 mm) away from the outer surface of the porous membrane 12 and blows out air from a plurality of the holes formed in the pipe (the air sweeper) to sweep off the fine powder deposited on the inner surface of the porous membrane 12. As shown in FIG. 5, a plurality of guide poles 20 are extended upward from the upper side of the periphery of the head section 13 and there are provided, at the second floor 21 of a housing, fixing members 22 each doubling as a guide when the guide poles 20 make a vertical movement. There is also provided, at the floor 21, at least one hoist 23 for raising or lowering the head section 13.

Next, the operation of the spray dryer of FIGS. 4 and 5 is described sequentially.

(1) When spray drying is over, each connecting member (pipe, etc.) is disconnected. The air sweeper 19 is also disconnected.

(2) A powder product receiving unit 24 accommodating an actuating device for the air sweeper 19 is displaced.

(3) The lock nuts of the fixing members 22 are disconnected and then the hoist 23 is actuated to lower the head section 13 along the guide poles 20.

(4) The head section 13 is stopped at a height at which an operator can work, and the head section 13 and the porous membrane 12 forming the bottom and side of the spray drying chamber 11 are disconnected.

(5) The head section 13 is washed and a different porous membrane 12 is fitted.

(6) The disconnected members, devices and units are refitted in the order of the above (3), (2) and (1), and a next operation is started.

At least three guide poles 20 are required in order for them to guide and stably maintain the head section 13. One to three hoists 23 are used ordinarily. The hoist 23 raises or lowers the head section 13 ordinarily via a chain. In order to stop the head section 13 at a desired position, the use of a limit switch is preferred.

Figure 6A:
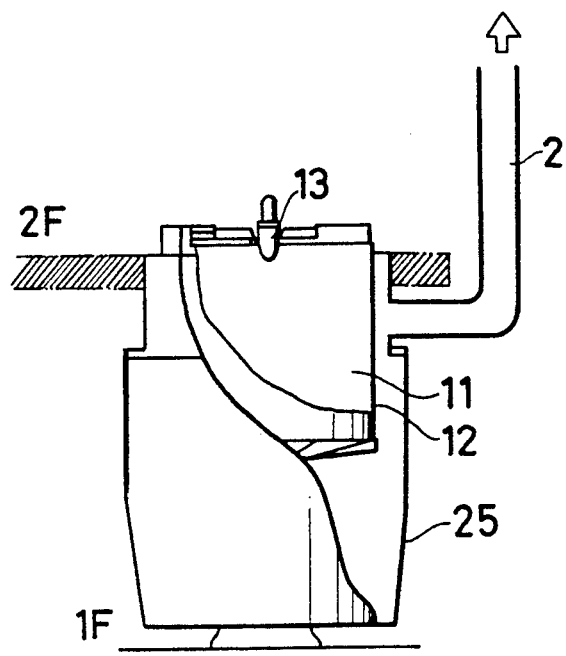
FIG. 6 is a sectional view showing an example of a spray dryer provided with a waste gas-shielding curtain, accommodated in a housing consisting of the first floor and the second floor, and (a) shows a state of spray drying operation and (b) and (c) each show a state where the waste gas-shielding curtain is stored.
Figure 6B:
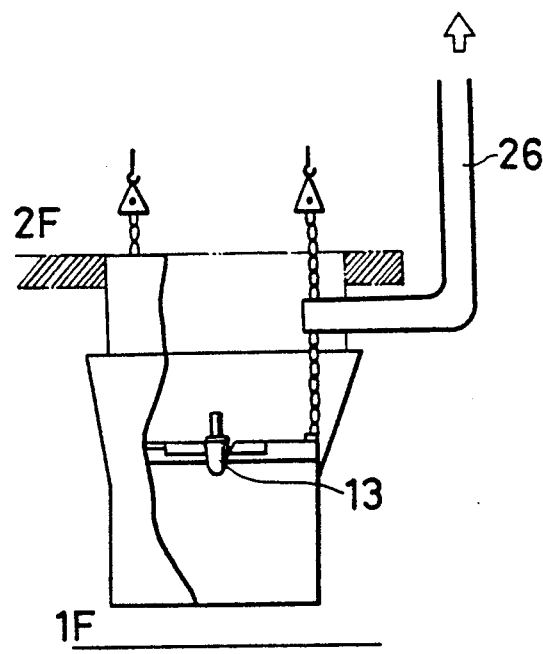
Figure 6C:
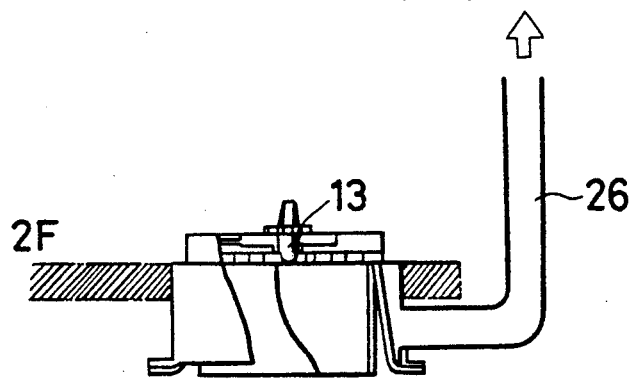

FIG. 6 is a sectional view showing an example of a spray dryer with a waste-gas shielding curtain installed in a housing consisting of the first floor and the second floor, and (a) shows a state of spray drying operation and (b) and (c) each shows a state where the waste gas-shielding curtain is stored.

A spray drying chamber 11 is constituted by a porous membrane 12 having, at the top, a head section 13 where an atomizer [e.g. spray nozzle, spray disc (rotary disc)] is provided. The porous membrane 12 is surrounded by a waste gas-shielding curtain 25 while 26 is a waste gas duct.

When this spray dryer is in operation, as shown in FIG. 6 (a), hot air is fed downward into the spray drying chamber 11 and momentarily dries a feed liquid sprayed by the spraying means provided in the head section 13 at the top of the spray drying chamber 11, whereby a vapor and a fine powder are produced. The fine powder is taken out from the outlet (not shown) at the bottom of the spray drying chamber 11. The gas is separated from the fine powder via the porous membrane 12 which may be substantially cylindrical as shown, for example, in FIG. 6(a) forming the spray drying chamber 11 and is discharged outside from the gap between the porous membrane 12 and the waste gas-shielding curtain 25 surrounding the porous membrane 12, via the waste gas duct 26. Since the spray drying chamber 11 is surrounded by the waste gas-shielding curtain 25, ventilation of the total housing is not necessary.

When the operation is over, the head section 13 is lowered; the waste gas-curtain 25 is hanged [see FIG. 6 (b)]; then, the head section 13 is raised; thereby, the waste gas-shielding curtain 25 is stored in the ceiling.

Figure 7:
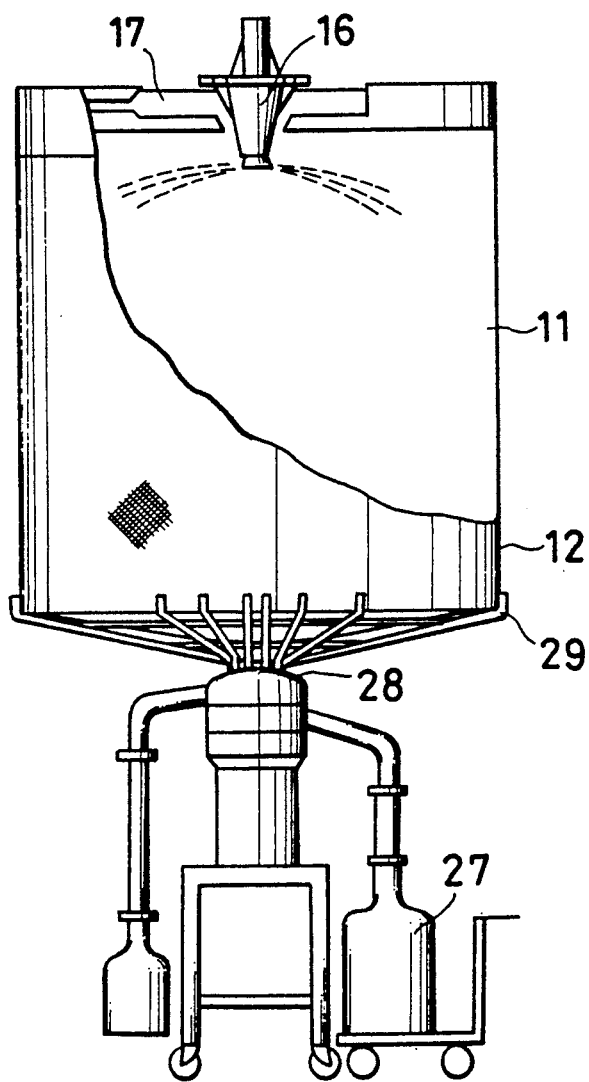

FIG. 7 is a schematic view showing an example of a spray dryer provided with a powder-sweeping-off mechanism. Comprising the mechanism is 11, a spray drying chamber formed by a porous membrane 12; an atomizer 16; a hot air distributor 17; a powder product recovering unit 27; a vibrating screen 28; and a skeletal structure of a vibration-transmitting mechanism 29.

When this spray dryer is in operation, the skeletal structure 29 connecting to the vibrating screen 28 transmits vibration to vibrate the porous membrane 12. Consequently, deposition of a fine powder on the porous membrane 12 hardly occurs.

Figure 8A:
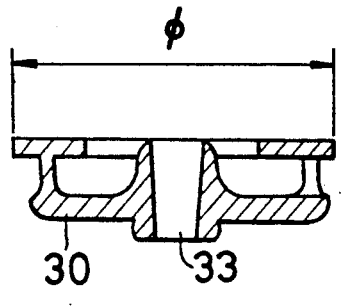
FIG. 8 shows an example of a rotary disc used in a spray drying chamber, where (a) is a sectional view of the rotary disc and (b) is a plan view of the rotary disc.
Figure 8B:
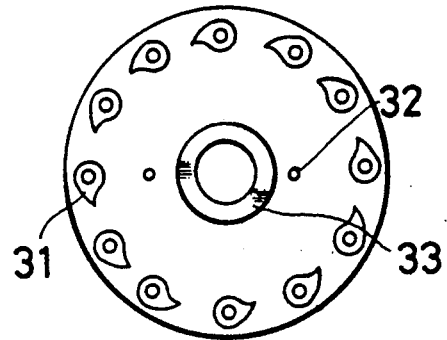
Figure 9:
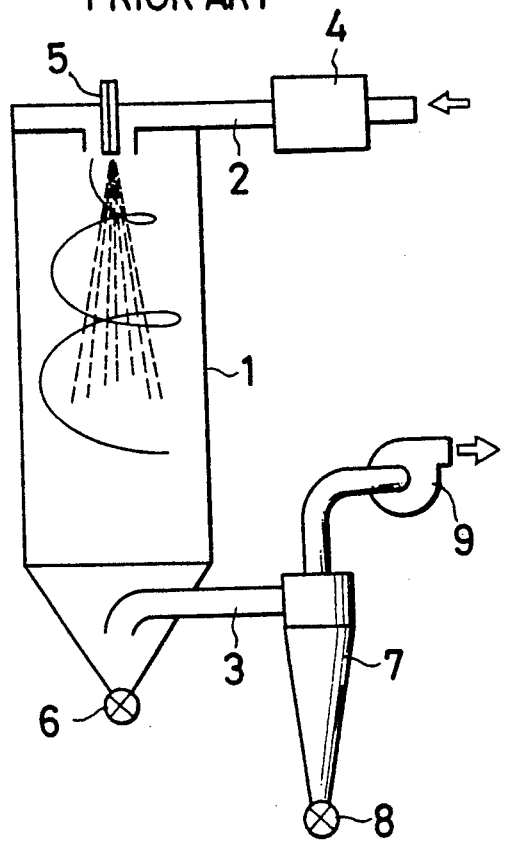
FIGS. 9 and 10 are each a schematic sectional view showing a conventional spray dryer.
Figure 10:
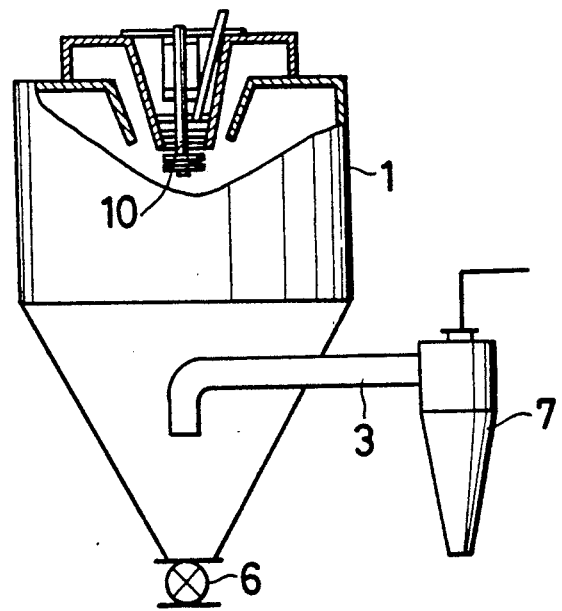

FIG. 8 shows an example of a rotary disc used in a spray dryer, (a) being a sectional view and (b) being a plan view. In these FIGURES, a large number of feed liquid-splitting pins 31 are provided, in the vicinity of the periphery of a metallic rotary disc 30. These pins 31 have a streamlined shape pointing to the rotating direction of the disc 30. Two feed liquid inlets 32 are provided in the disc 30 near a shaft 33.

A feed liquid is introduced into the rotary disc 30 from the inlets 32 and sprayed in the circumferential direction via the pins 31. Since the feed liquid-splitting pins 31 have a streamlined shape and thereby the scattering of the feed liquid to outside the disc is reduced partially, the feed liquid is sprayed to outside the disc not only from near the feed liquid inlets 32 but also from the pins 31 provided distant from the inlets 32.

The spray dryer of the present invention is described more specifically below.

EXAMPLE 1

Into a spray dryer as shown in FIG. 1 were sprayed a feed liquid containing 60% of stabilized zirconia ($Ca_{0.15}Zr_{0.85}O_{1.85}$) or 70% of lanthanum-added barium titanate [$BaTiO_3 + 0.01(La_2O_3)$], at a rate of 50 kg/hr. The spray drying chamber had an inlet diameter of 600 mm, an outlet diameter of 350 mm, a cylinder portion diameter of 2,500 mm, a cylinder portion height of 2,500 mm, a funnel portion height of 1,000 mm and a total height of 3,500 mm, and thus had a cylindrical shape at the upper portion and a funnel shape at the lower portion. As the porous filter forming the spray drying chamber, there was used a laminate membrane obtained by laminating a heat-resistant nylon-made unwoven cloth with a polytetrafluoroethylene. The inlet temperature of hot air was 220° C. and the waste gas temperature was 120° C. The pressure difference between the inside and the outside of the spray drying chamber was 12.7 mm Aq. (the inside pressure was higher), and the gas permeability of the porous membrane at that pressure difference was 5 cc/sec/$cm^2$.

The spray drying operation of the above two feed liquids were conducted under the above conditions. The fine powder products obtained had the following properties.

|  | (1) | (2) |
| --- | --- | --- |
| Average particle diameter of product | 60 μm | 70 μm |
| Water content of product | 0.3% | 0.3% |
| Compositional variation | No | No |
| Yield in 4 hour operation | 99% | 99% |

(1) shows the stabilized zirconia and (2) shows the lanthanum-added barium titanate.

The porous membrane caused no powder leakage. The time required for product switch-over was as short as 20 minutes.

Since the porous membrane was replaced at the product switch-over, there was no pollution of the porous membrane. Since the fixing section other than the porous membrane was small, its washing was very simple.

EXAMPLE 2

Spray drying operation was conducted under the same conditions as in Example 1 except that a spray drying chamber such as that shown in FIG. 3 was used (the shape and dimensions of the chamber were same as those of the chamber of FIG. 1) and the ceiling and bottom of the chamber were made gas impermeable by covering them with a heat-resistant sheet (a silicone rubber manufactured by Shin-Etsu Chemical).

The fine powder products obtained had almost the same properties as those obtained in Example 1. The tumbling of powder at the bottom of the spray drying chamber was very smooth and there was no deposition of powder at the bottom.

INDUSTRIAL APPLICABILITY

As described above, in the spray dryer of the present invention, no slight variation in product composition occurs, and the frequent product switch-over required in many grade, small quantity type production can be effected rapidly because the porous membrane can be replaced easily. Further, the replacement of the porous membrane can be made at a desired height because the head section is displaceable vertically, and the washing of the porous membrane and the maintenance of the atomizer can be made at the most convenient position.

We claim:

1. A spray dryer for drying microdrops of a feed liquid in a spray drying chamber thereof, said spray drying chamber comprising:
   a vertically displaceable head section; and
   a heat-resistant, porous resilient membrane attached at a top portion thereof to a bottom surface of said head section, said porous membrane being detachable from said head section at the top portion and having means for eliminating static electricity therefrom;
   wherein the microdrops and hot air are sprayed into said spray drying chamber, thereby drying the microdrops to form a powder at the bottom of said porous membrane.

2. A spray dryer for drying microdrops of a feed liquid in a spray drying chamber thereof, said spray drying chamber comprising:
   a vertically displaceable head section;
   a heat-resistant, porous resilient membrane attached at a top portion thereof to a bottom surface of said head section, said porous membrane being detachable from said head section at the top portion; and
   a rotary disc atomizer for spraying the microdrops into said spray drying chamber, said rotary disc atomizer having a thin adhesion-resistant layer disposed on a surface thereof which contacts the feed liquid;
   wherein the microdrops and hot air are sprayed into said spray drying chamber; thereby drying the microdrops to form a powder at the bottom of said porous membrane.

3. A spray dryer for drying microdrops of a feed liquid in a spray drying chamber thereof, said spray drying chamber comprising:
   a vertically displaceable head section;
   a heat-resistant, porous resilient membrane attached at a top portion thereof to a bottom surface of said head section, said porous membrane being detachable from said head section at the top portion; and a rotary disc atomizer for spraying the microdrops into said spray drying chamber, said rotary disc atomizer comprising feed liquid splitting pins each having a projection which reduces scattering of the feed liquid outside said rotary disc atomizer;

wherein the microdrops and hot air are sprayed into said spray drying chamber, thereby drying the microdrops to form a powder at the bottom of said porous membrane.

* * * * *